United States Patent [19]

Bentson

[11] Patent Number: 4,674,909

[45] Date of Patent: Jun. 23, 1987

[54] LOCKING CLAMP FOR BALL JOINT

[75] Inventor: Richard L. Bentson, Everett, Wash.

[73] Assignee: The Boeing Company, Seattle, Wash.

[21] Appl. No.: 919,891

[22] Filed: Oct. 15, 1986

[51] Int. Cl.⁴ .............................................. B25G 3/00
[52] U.S. Cl. .................................... 403/316; 403/320;
                                                      285/82; 285/263
[58] Field of Search .................. 403/316, 320; 285/82,
                                                      285/91, 92, 263

[56] References Cited

U.S. PATENT DOCUMENTS

| | | | |
|---|---|---|---|
| 1,241,962 | 10/1917 | Greve ................................... | 403/316 |
| 1,416,232 | 5/1922 | Osborn . | |
| 1,519,111 | 12/1924 | Brownell . | |
| 1,568,649 | 1/1926 | Woodruff . | |
| 1,691,599 | 11/1928 | Zimmermann .................... | 285/92 X |
| 1,888,741 | 11/1932 | Schellin . | |
| 2,212,571 | 8/1940 | Martin ................................. | 285/177 |
| 2,355,166 | 8/1944 | Johanson ............................. | 285/82 |
| 2,383,679 | 8/1945 | Phillips ............................... | 285/95 |
| 2,421,691 | 6/1947 | Gibson, Jr. et al. .................. | 285/95 |
| 3,995,889 | 12/1976 | Carr et al. ........................... | 285/91 |
| 4,343,499 | 8/1982 | Dumar, Jr. et al. ................. | 285/263 |

Primary Examiner—Andrew V. Kundrat
Attorney, Agent, or Firm—Bruce A. Kaser

[57] ABSTRACT

A locking clamp (10) is provided for preventing loosening of two threadedly coupled members (18, 20). The clamp (10) has a band (36) that encircles one of the members (18) around an outer cylindrical surface thereof. A pin assembly (62) prevents circumferential slipping of the band relative to this surface. An indexing member (48) connected to the band is engaged with the second coupled member (20) and thus prevents rotation of the second member relative to the first.

1 Claim, 10 Drawing Figures

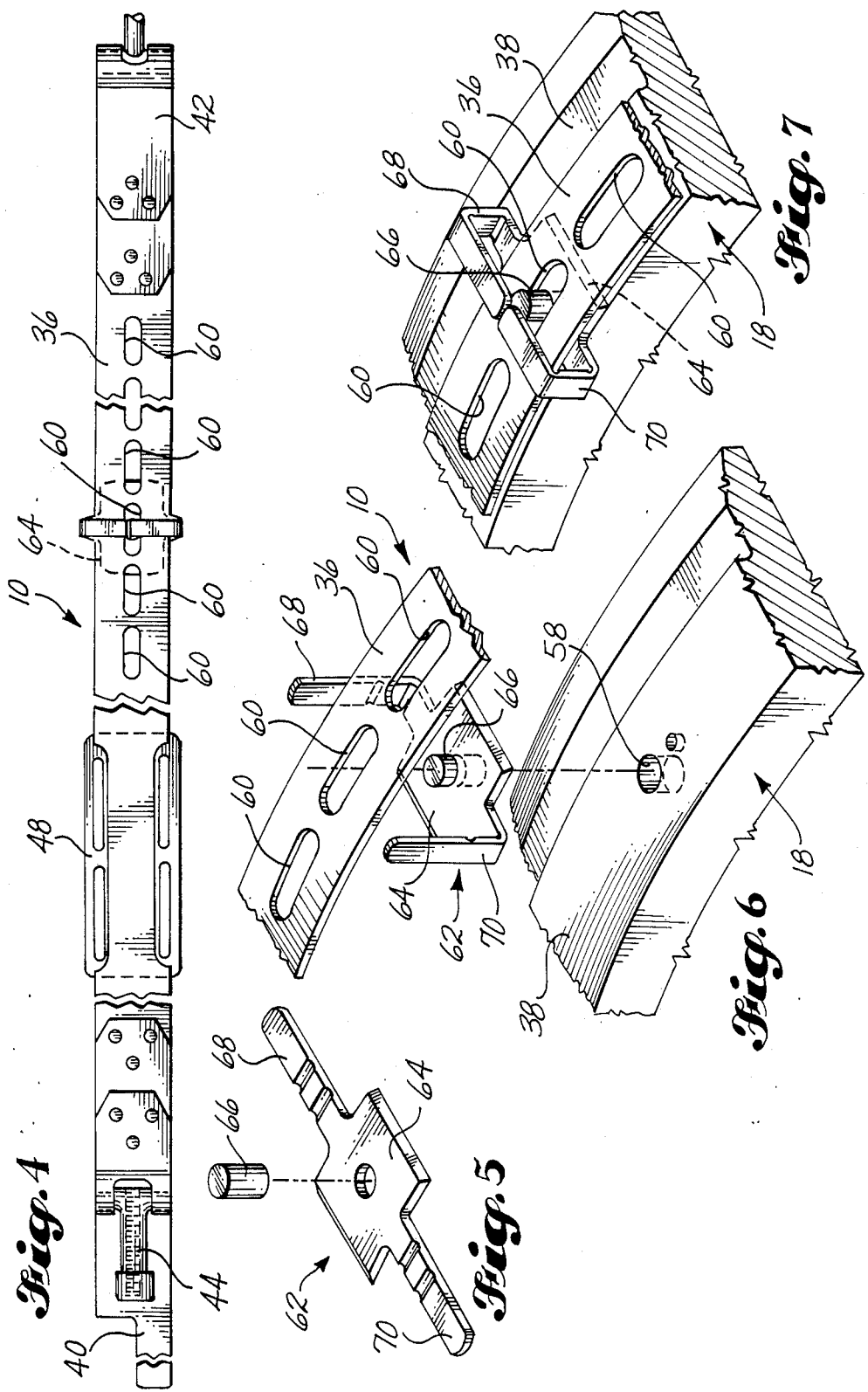

LOCKING CLAMP FOR BALL JOINT

DESCRIPTION

TECHNICAL FIELD

This invention relates to threaded couplings for conduit sections. More particularly, it relates to devices which prevent the loosening of threaded couplings.

BACKGROUND ART

Ball joints for coupling sections of conduit together are well-known. Although this type of coupling can have a variety of different structural forms, all typically provide a certain amount of swiveling capability at a conduit joint, and all typically utilize threaded couplings to a certain extent. A common problem associated with using threaded couplings is that they can loosen because of vibration or other factors. In certain kinds of ball joints, for example, the tightening of a threaded coupling fixes a swiveling ball joint in position, and any loosening of the coupling permits undesirable swiveling, which may further result in leakage of the particular fluid communicated through the ball joint. The present invention is directed toward preventing this type of loosening.

DISCLOSURE OF THE INVENTION

This invention is a locking clamp adapted for preventing rotation between members that are threadedly coupled together. Typically, for example, rotation of one such member relative to the other causes the members to be screwed inwardly or outwardly relative to each other.

The invention includes a locking band that encircles one of the coupled members and which is positioned against an outer cylindrical surface thereof. On this surface is a plurality of inwardly recessed openings distributed circumferentaially around the surface. A means is provided for connecting one end of the locking band to the other, to hold the band against the surface. Preferably, such means also includes means for drawing and tightening the band against the surface.

The locking band has a plurality of openings extending through the thickness of the band. These openings are positioned in sequential series in one portion of the band. Fixedly connected to another portion of the band is an indexing member. The other one of the two coupled members has an indexing portion, fixedly connected to such other member, which engages with the indexing member of the locking band. A pin assembly, having a relatively flat tab plate, and a pin projecting outwardly from both sides of the plate, is positioned between the locking band and the cylindrical outer surface of the first coupled member. One portion of the pin which projects from one side of the plate is engaged with one of the above-mentioned plurality of inwardly recessed openings in the cylindrical outer surface of the first member. The other portion of the pin which projects form the other side is engaged with one of the plurality of openings in the locking band.

The engagement of the indexing portion of the second coupled member with the indexing member of the band prevents rotation of the second member relative to the first unless the locking band also moves or slips circumferentally around the first member. However, this is prevented by both tightening the band around the first member a sufficient amount to prevent such slippage, and by the pin assembly which further insures no slipping can occur unless the band is loosened to the point of permitting removal of the pin assembly from between the band and the first member's cylindrical outer surface.

An advantage to a locking clamp constructed in accordance with the invention is that it is highly resistant to fatigue and wear, especially in high vibration environments. The locking clamp is significantly stronger than any other device known in the art having a like function.

Another advantage to the invention is that it can be installed on a ball joint coupling without requiring disassembly of the coupling.

These advantages, and others, will be readily understood from the following description of the best mode for carrying out the invention while making reference to the accompanying drawings.

BRIEF DESCRIPTION OF THE DRAWINGS

In the drawings, which accompany the description of the invention presented herein, like reference numerals and letters refer to like parts throughout the various views, and wherein:

FIG. 4 is a fragmentary view of the locking clamp removed from the ball joint and shows various sections of the clamp along its length;

FIG. 5 is an exploded pictorial view of a pin assembly which prevents circumferential slippage of the locking clamp relative to the ball joint;

FIG. 6 is a fragmentary pictorial view showing how the pin assembly of FIG. 5 engages with both a recessed opening in the ball joint and the locking clamp when the clamp is being applied around the ball joint;

FIG. 7 is a view like FIG. 6 but shows the final position of the pin assembly between the locking clamp and the ball joint after the clamp is installed around the ball joint;

BEST MODE FOR CARRYING OUT THE INVENTION

Figure 1:
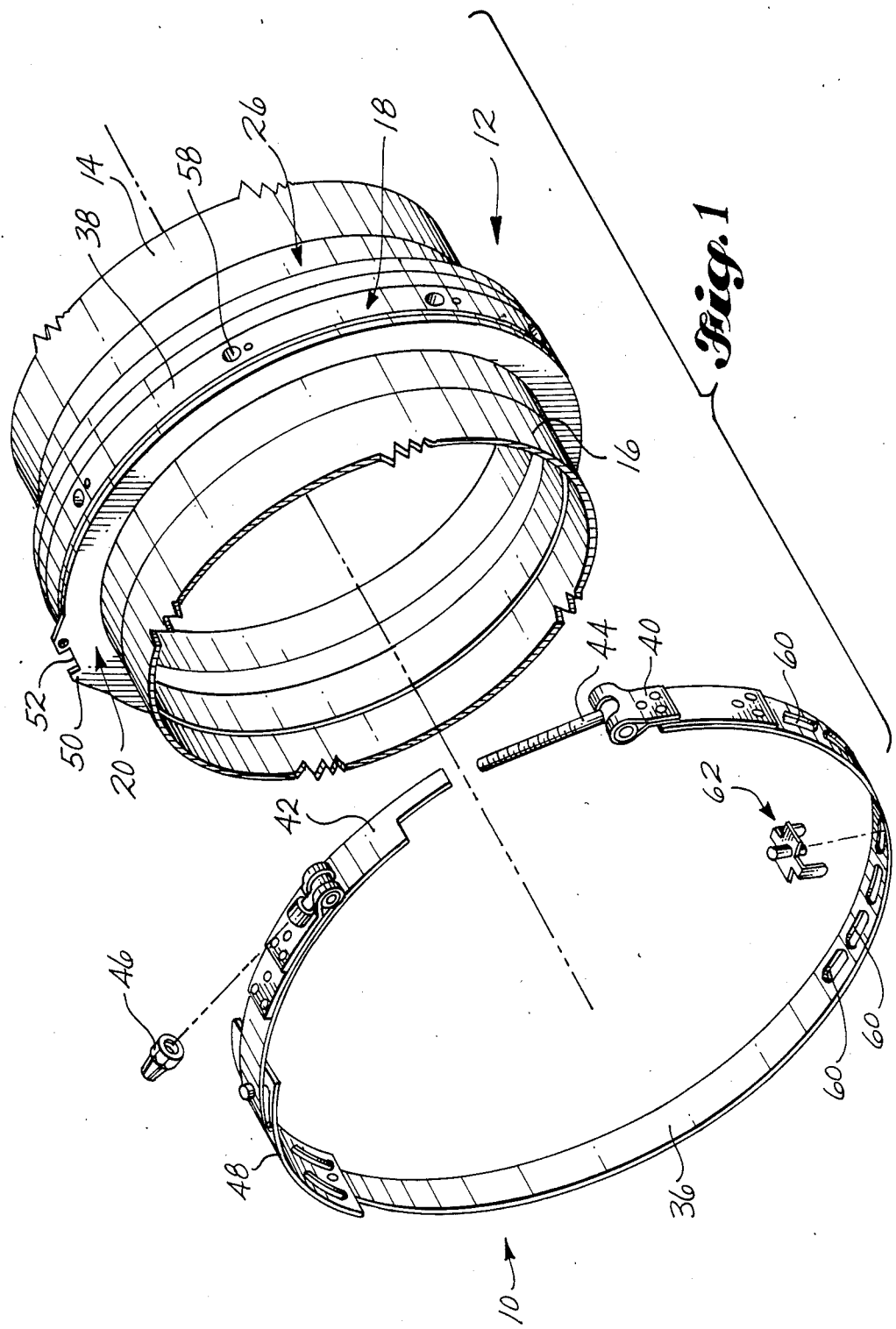
FIG. 1 is a pictorial view of both a locking clamp constructed in accordance with a preferred embodiment of the invention, and a typical pneumatic ball joint on which the locking clamp is used.
Figure 2:
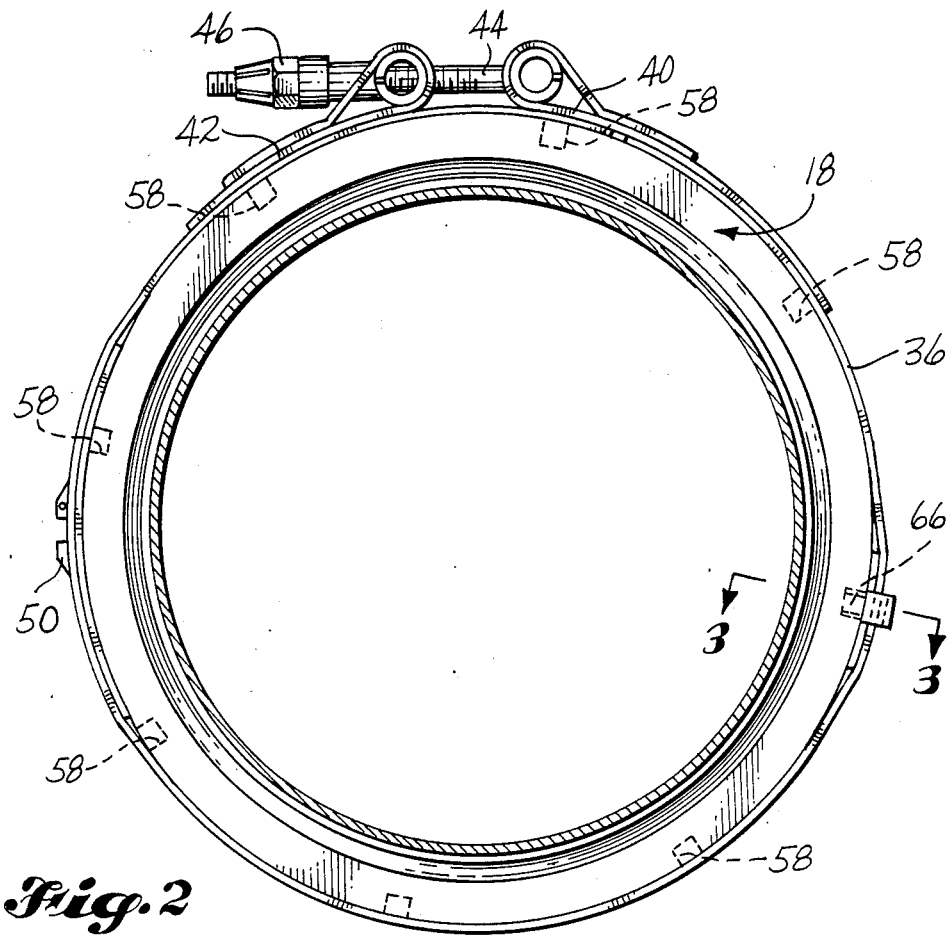
FIG. 2 is an end view of the ball joint shown in FIG. 1 and shows the locking clamp attached to the ball joint.
Figure 3:
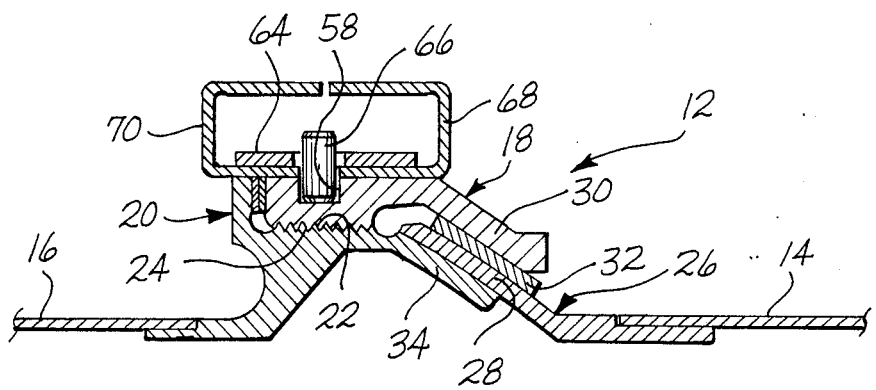
FIG. 3 is a cross-sectional view of the ball joint and locking clamp taken along line 3—3 in FIG. 2.
Figure 8:
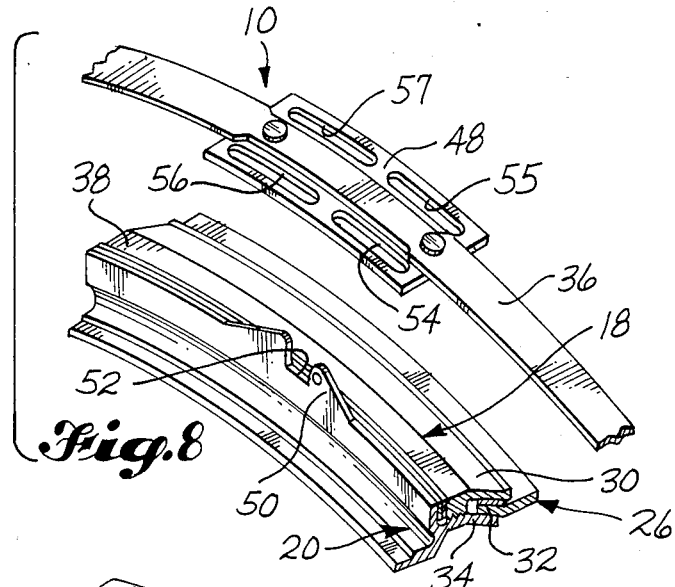
FIG. 8 is a fragmentary pictorial view showing how an indexing member attached to the locking clamp engages with an indexing portion of one threaded member of the ball joint.
Figure 9:
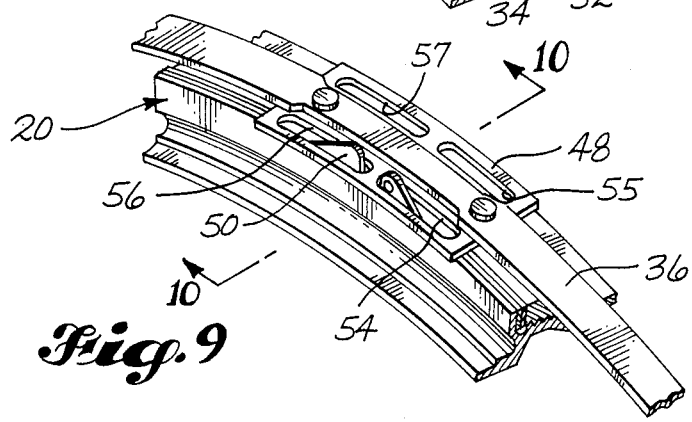
FIG. 9 is a view like FIG. 8 but shows the final position of the indexing member in engagement with the coupled member's indexing portion when the locking clamp is installed around the ball joint.
Figure 10:
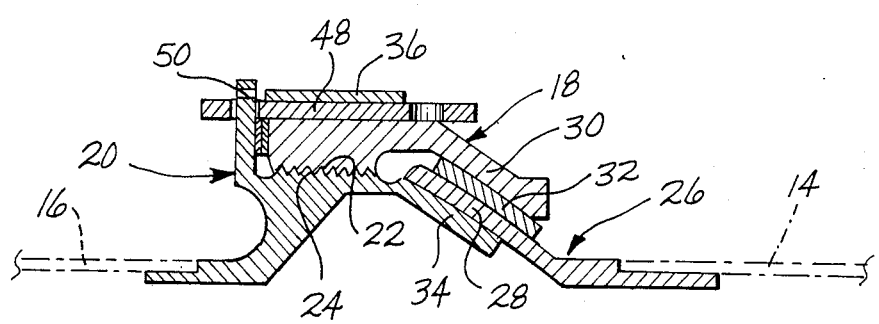
FIG. 10 is a cross-sectional view of the ball joint and locking clamp and is taken along line 10—10 in FIG. 9.

Referring now to the drawings, and first to FIG. 1, therein is shown at 10 a locking clamp constructed in accordance with a preferred embodiment of the invention. The locking clamp 10 is adapted for use in preventing the loosening of a threaded coupling in a pneumatic ball joint 12. Referring also now to FIGS. 3 and 10, the ball joint 12 is of a construction that would be familiar to a person skilled in the art. Briefly, the ball joint may be used to connect together sections 14, 16 of a conduit.

A first member 18 of the ball joint 12 is an annular nut member. A second member 20, connected to one of the conduit sections 16, has an outwardly threaded portion 22 which is in threaded engagement with an inwardly threaded portion 24 of the nut member 18. Rotating the first or nut member 18 in one direction or another relative to the second member 20 causes the two members 18, 20 to be screwed inwardly or outwardly.

a third member 26 of the ball joint 12 is connected to the other conduit section 14. This last member 26 has an outwardly flared end portion 28 with a spherical shape sized to mate with a spherically shaped inwardly tapered portion 30 of the nut member 18. A seal 32 may be provided between the outwardly and inwardly tapered portions 28, 30, respectively. Screwing the nut member 18 in one direction forces an inwardly tapered portion 34 of the second member 20 against the outwardly tapered portion 28 of the third member 26. This sandwiches this portion between the nut member 18 and the second member 20 and fixes it in place. When the nut member 18 is unscrewed in the other direction, the third member 26 can swivel a certain amount relative to both the nut member 18 and the second member 20 for making adjustments.

The locking clamp 10 is made of a metal band 36 which encircles the nut member 18. The band is positioned adjacent a cylindrical outer surface portion 38 of the nut member 18. As is best seen in FIG. 1, the ends 40, 42 of the locking clamp are connected together by a swing bolt 44. The construction of the swing bolt 44 would be familiar to a person skilled in the art and the clamp 10 can be tightened around the cylindrical outer surface 38 by suitably tightening the swing bolt's nut 46.

Connected to the locking clamp 10 by means of rivets or other suitable means is an indexing member 48. The second member 20 of the ball joint 12 which, as was mentioned above, is threadedly connected to the first or nut member 18, has a radially projecting indexing portion 50 that projects outwardly past the cylindrical outer surface 38 of the nut member 18. This indexing portion 50 has a slot 52 which permits the indexing portion 50 to mate or engage with a pair of slots 54, 56 extending along an edge of the locking clamp's indexing member 48. Another pair of slots 55, 57 extend along the other edge to permit the position of the clamp 10 to be reversed around the nut member 18.

Spaced equidistantly around the nut member's outer cylindrical surface portion 38 are a plurality of recessed openings or pin holes 58. The locking clamp 10 has a portion that includes a plurality of slots 60 which extend through the thickness of the metal band 36 making up the clamp. A pin assembly, indicated generally at 62 in FIGS. 5 and 6, is provided for insuring that the locking clamp will not slip circumferentially once it has been connected to the outer surface of the nut member 18.

The pin assembly 62 has a flat tab plate 64 that is positioned between the clamp's band 36 and the nut member's cylindrical outer surface 38. A pin 66, which is fixedly connected to the tab plate 64, extends and projects both upwardly and downwardly from both sides of the plate 64. That portion of the pin 66 which projects downwardly is received in one of the recessed openings 58 in the nut member's outer surface 38. The other portion projects upwardly through one of the slots 60 in the metal band 36. The tab plate 64 has a pair of tabs 68, 70 which may be bent around and over the top of the band 36 to tether the pin assembly to the band for preventing loss during disassembly.

As mentioned above, the swing bolt 44 and its nut 46 are used to tighten the locking clamp's metal band 36 around the outer cylindrical surface 38 of the nut member 18. Use of the swing bolt alone normally tightens the band a sufficient amount to prevent it from slipping. However, the pin assembly 62 by engaging with both an opening 58 in the nut member and a slot 60 in the band 36 further insures no slipping will occur. Engagement of the indexing member 48, which is fixedly connected to the band 36, with the indexing portion 50 of the second ball joint member 20, insures therefore that the second member 20 cannot rotate relative to the nut member 18 unless the locking clamp 20 is loosened a sufficient amount to disengage either the indexing member 48 or the pin assembly 62 a certain distance from the nut member's surface. Thus, the locking clamp 10 prevents loosening of the nut member 18 from the second ball joint member 20 so that the outwardly flared portion 28 of the third ball joint member 26 maintains a fixed position sandwiched between the ball joint's second member 20 and nut member 18.

It should be understood that the above description was provided above only for illustrative purposes. It should be appreciated that the locking clamp device described above could be modified in many ways without departing from the spirit and scope of the invention. Any patentable subject matter is not to be limited by the above description but only by the subjoined claims which follow, wherein interpretation of such claims is to be made in accordance with the well-established doctrines of patent claim interpretation.

What is claimed is:

1. For a member threadedly coupled to another member in a manner so that rotation of one coupled member relative to the other causes said members to be screwed inwardly or outwardly relative to each other depending on the direction of rotation, a locking clamp device for preventing such rotation, comprising:

a locking band encircling one of said coupled members, with one member having a cylindrical outer surface portion against which said band is positioned, said outer surface portion including a plurality of inwardly recessed openings, and means for connecting one end of said locking band to another end, and for drawing and tightening said band against said outer surface portion, said band having a plurality of openings through the thickness of said band, and including an indexing member fixedly connected to said band, wherein the other of said coupled members includes an indexing portion engaged with said indexing member, and a pin assembly having a relatively flat tab plate, and a pin having portions that project outwardly from both sides of said tab plate, wherein said tab plate is disposed between said locking band and said cylindrical outer surface portion of said one coupled member, and wherein that portion of said pin which projects from one side of said tab plate is engaged with one of said plurality of inwardly recessed openings in said cylindrical outer surface portion, and wherein that portion of said pin which projects from the other side of said tab plate is engaged with one of said plurality of openings through said locking band.

* * * * *

UNITED STATES PATENT AND TRADEMARK OFFICE
CERTIFICATE OF CORRECTION

PATENT NO. : 4,674,909

DATED : June 23, 1987

INVENTOR(S) : Richard L. Bentson

It is certified that error appears in the above-identified patent and that said Letters Patent are hereby corrected as shown below:

Column 1, line 38, "circumferentaially" should be -- circumferentially --.

Column 1, line 59, "form" should be -- from --.

Column 1, line 65, "circumferentally" should be -- circumferentially --.

Column 3, the first word in line 9, "a", should be capitalized.

Column 3, line 19, after "this portion", insert -- 28 --.

Claim 1, column 4, line 42, after "with", insert -- said --.

Signed and Sealed this

Nineteenth Day of January, 1988

*Attest:*

DONALD J. QUIGG

*Attesting Officer*     *Commissioner of Patents and Trademarks*